United States Patent
Sipilä

(10) Patent No.: US 7,359,708 B2
(45) Date of Patent: Apr. 15, 2008

(54) HARD HANDOVER METHOD, CONTROLLER AND COMMUNICATION SYSTEM

(75) Inventor: Juha Sipilä, Nokia (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/142,666

(22) Filed: Jun. 2, 2005

(65) Prior Publication Data

US 2006/0073828 A1    Apr. 6, 2006

(30) Foreign Application Priority Data

Oct. 6, 2004   (FI) ................................. 20045375

(51) Int. Cl.
*H04Q 7/20*   (2006.01)
(52) U.S. Cl. ................. 455/436; 455/439; 370/331
(58) Field of Classification Search ........ 455/436–439; 370/330–331, 332
See application file for complete search history.

(56) References Cited

U.S. PATENT DOCUMENTS

| | | | | |
|---|---|---|---|---|
| 6,026,301 | A * | 2/2000 | Satarasinghe | 455/436 |
| 6,061,337 | A * | 5/2000 | Light et al. | 370/331 |
| 6,075,989 | A * | 6/2000 | Moore et al. | 455/436 |
| 6,208,860 | B1 * | 3/2001 | Kim et al. | 455/440 |
| 6,433,739 | B1 * | 8/2002 | Soliman | 342/387 |
| 6,449,290 | B1 * | 9/2002 | Willars et al. | 370/507 |
| 6,826,161 | B1 * | 11/2004 | Shahidi et al. | 370/331 |
| 6,892,071 | B2 * | 5/2005 | Park et al. | 455/436 |
| 6,944,466 | B2 * | 9/2005 | Bi et al. | 455/456.1 |
| 6,954,644 | B2 * | 10/2005 | Johansson et al. | 455/436 |
| 7,197,307 | B2 * | 3/2007 | Kirla | 455/436 |
| 2005/0020264 | A1 * | 1/2005 | Akao et al. | 455/436 |
| 2005/0192010 | A1 * | 9/2005 | Kirla | 455/438 |

FOREIGN PATENT DOCUMENTS

WO    WO 95/04438    2/1995

OTHER PUBLICATIONS

3GPP(Global System for Mobile Communications) ETSI TS 123 009 V4.4.0, "Digital cellular telecommunications system (Phase 2+); Universal Mobile Telecommunications System (UMTS); Handover procedures", Jun. 2002, pp. 21-23.

EventHelix.com Inc., "Inter BSC—Intra MSC Handover Call Flow (GSM Inter BSC-Intra MSC Handover Call Flow)", Dec. 4, 2004, pp. 1-3.

* cited by examiner

*Primary Examiner*—CongVan Tran
(74) *Attorney, Agent, or Firm*—Squire, Sanders & Dempsey, L.L.P.

(57) ABSTRACT

The invention is related to a controller of a communication system, the controller comprising: means for determining user terminal time delay between delivery and acknowledgement of a transmission; means for conveying the user terminal time delay; means for calculating switching time delay; and means for transferring user terminal data conveyance to the handover target network controller at a moment based on the switching time delay.

21 Claims, 3 Drawing Sheets

HARD HANDOVER METHOD, CONTROLLER AND COMMUNICATION SYSTEM

FIELD

Figure 1:
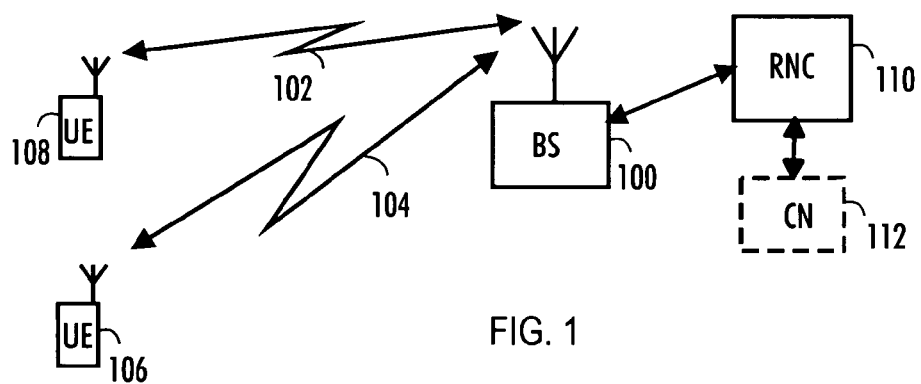

The invention relates to a hard handover method, a controller of a communication system and a communication system.

BACKGROUND

The handover (or handoff) procedure is a means to continue a call when a user terminal crosses the border of one cell into another. In a cellular network, a cell has typically several neighbouring cells. The basic concept of a handover is that when the user terminal moves from the coverage area of one cell to another, a new connection is set up with a target cell and the connection with the old cell may be released. In many cases, an inter radio network controller hard handover is carried out.

In inter radio network controller (radio network controller=RNC) hard handovers, the main problem is to find a right time for switching from a handover source RNC to a handover target RNC due to delays in the handover process.

BRIEF DESCRIPTION

According to an aspect of the invention, there is provided a hard handover method in a communication system, the method comprising: determining user terminal time delay between delivery and acknowledgement of a transmission, in a handover source network controller; conveying the user terminal time delay to a handover target network controller; calculating switching time delay in the handover target network controller using the user terminal time delay; and transferring user terminal data conveyance to the handover target network controller at a moment based on the switching time delay.

According to another aspect of the invention, there is provided a hard handover method in a communication system, the method comprising: determining user terminal time delay between delivery and acknowledgement of a transmission, in a handover source network controller; conveying the user terminal time delay to a handover target network controller; calculating switching time delay in the handover target network controller; and transferring user terminal data conveyance to the handover target network controller at a moment based on the switching time delay.

According to another aspect of the invention, there is provided a controller of a communication system, the controller comprising: means for determining user terminal time delay between delivery and acknowledgement of a transmission; means for conveying the user terminal time delay; means for calculating switching time delay; and means for transferring user terminal data conveyance to the handover target network controller at a moment based on the switching time delay.

According to another aspect of the invention, there is provided a controller of a communication system, the controller being configured to: determine user terminal time delay between delivery and acknowledgement of a transmission; convey the user terminal time delay; calculate switching time delay; and transfer user terminal data conveyance to the handover target network controller at a moment based on the switching time delay.

According to another aspect of the invention, there is provided a communication system, the system comprising: means for determining user terminal time delay between delivery and acknowledgement of a transmission; means for conveying the user terminal time delay; means for calculating switching time delay; and means for transferring user terminal data conveyance to the handover target network controller at a moment based on the switching time delay.

According to another aspect of the invention, there is provided a communication system, the system being configured to: determine user terminal time delay between delivery and acknowledgement of a transmission; convey the user terminal time delay; calculate switching time delay; and transfer user terminal data conveyance to the handover target network controller at a moment based on the switching time delay.

Embodiments of the invention are described in the dependent claims.

The method and system of the invention provide several advantages. An embodiment provides a method for determining a hard handover RNC switching time taking delays in to account, which gives a more accurate estimate of the switching time.

LIST OF DRAWINGS

Figure 4:
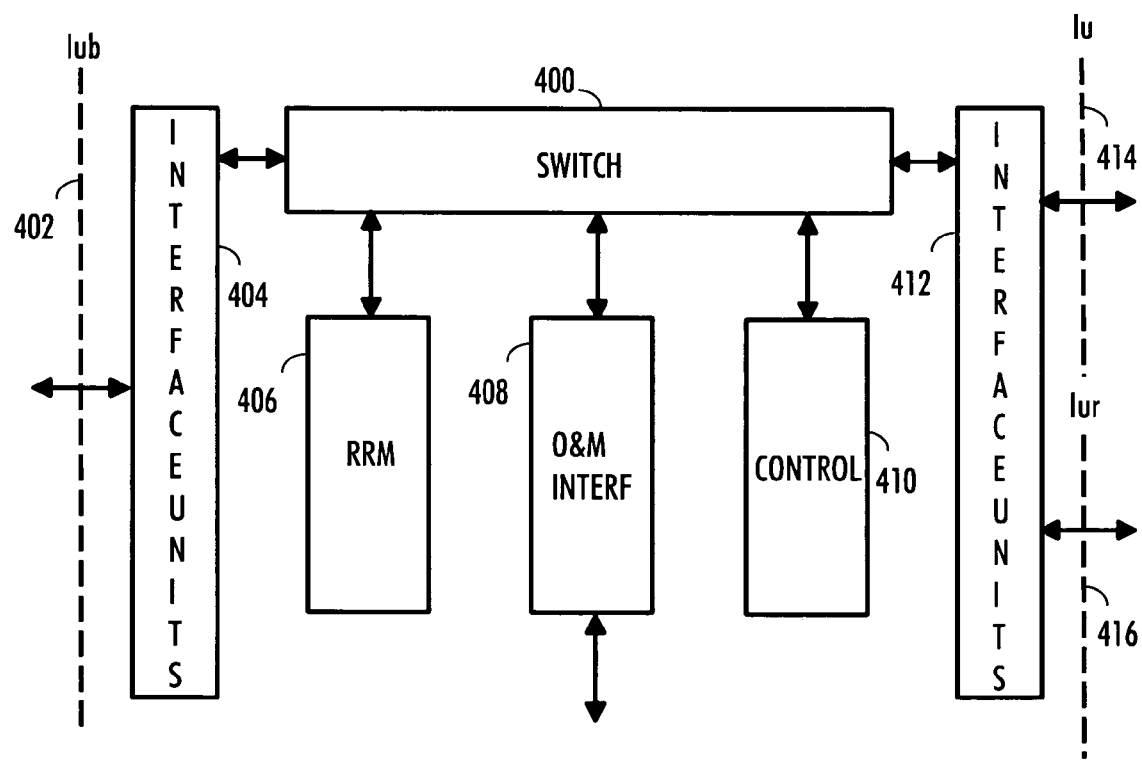
Figure 2:
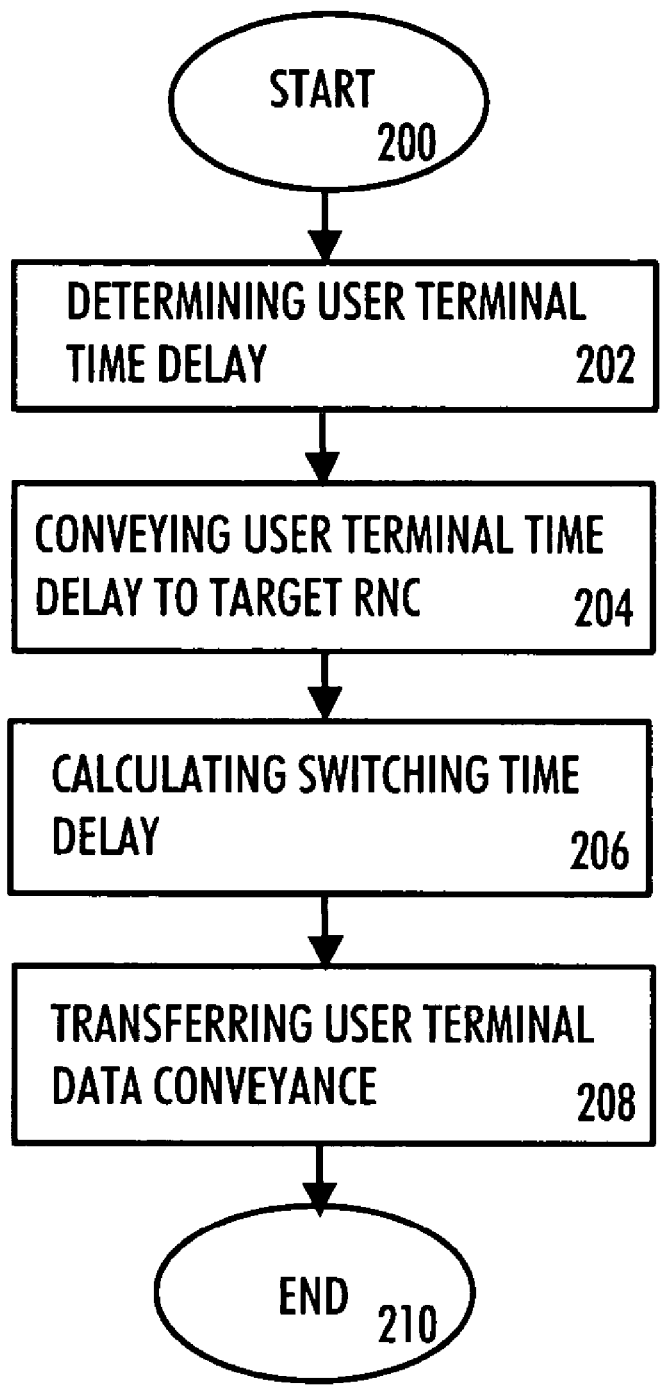
Figure 3:
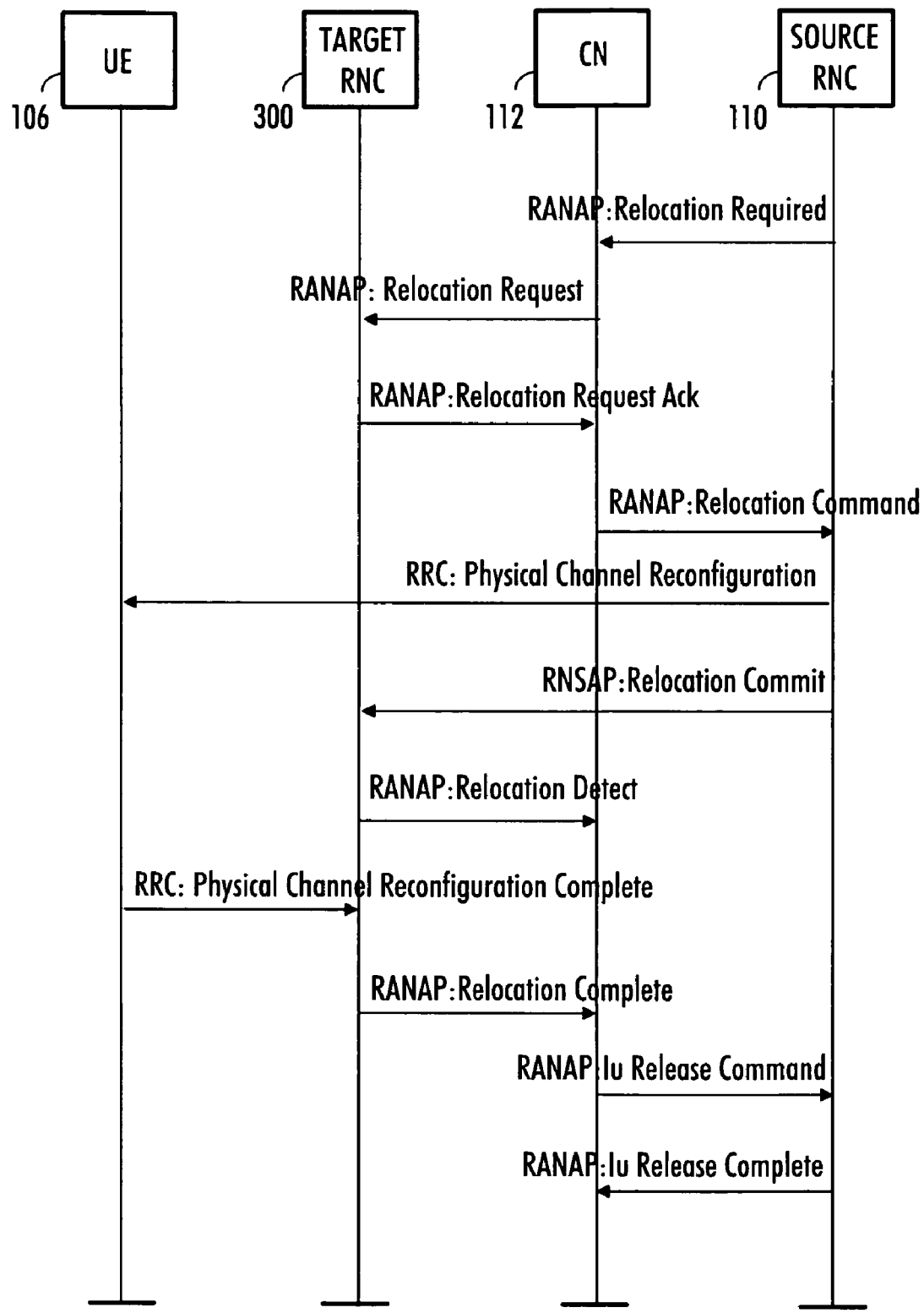

In the following, the invention will be described in greater detail with reference to the preferred embodiments and the accompanying drawings, in which FIG. 1 shows an example of a communication system, FIG. 2 is a flow chart, FIG. 3 shows an example of message communications, and FIG. 4 is a block diagram illustrating an example of the radio network controller's logical structure.

DESCRIPTION OF EMBODIMENTS

With reference to FIG. 1, we examine an example of a communication system in which embodiments of the invention can be applied. The present invention can be applied in various communication systems. One example of such a communication system is Universal Mobile Telecommunications System (UMTS) radio access network. It is a radio access network which includes wideband code division multiple access (WCDMA) technology and can also offer real-time circuit and packet switched services. Another example is Global System for Mobile Communications (GSM). The embodiments are not, however, restricted to the systems given as examples but a person skilled in the art may apply the solution in other communication systems provided with the necessary properties.

It is clear to a person skilled in the art that the method according to the invention can be applied to systems utilizing different modulation methods or air interface standards.

FIG. 1 is a simplified illustration of a digital data transmission system to which the solution according to the invention is applicable. This is a part of a cellular radio system, which comprises a base station (or a node B) 100, which has bi-directional radio links 102 and 104 to user terminals 106 and 108. The user terminals may be fixed, vehicle-mounted or portable. The base station includes transceivers, for instance. From the transceivers of the base station, there is a connection to an antenna unit that establishes the bi-directional radio links to the user terminal. The base station is further connected to a controller 110, a radio network controller (RNC) or a base station controller (BSC), which transmits the connections of the terminals to the other parts of the network. The base station controller controls in a centralized manner several base stations connected to it. The base station controller or the radio network controller is further connected to core network 112 (CN). Depending on the system, the counterpart on the CN side can be a mobile services switching centre (MSC), a media gateway (MGW) or a serving GPRS (general packet radio service) support node (SGSN).

The cellular radio system can also communicate with other networks, such as a public switched telephone network or the Internet.

The handover (or handoff) procedure is a means to continue a call when a user terminal crosses the border of one cell into another. In a cellular network, a cell has typically several neighbouring cells. The basic concept of a handover is that when the user terminal moves from the coverage area of one cell to another, a new connection is set up with the target cell and the connection with the old cell is released.

In WCDMA systems (Wide Band Code Division Multiple Access), like UMTS (Universal Mobile Telecommunication System), there are several different types of hard handovers, such as intra-frequency handovers, inter-frequency handovers and inter-system handovers. For performing a successful handover, the user terminal has to perform measurements to find out whether the signal of a base station (or node B) to which it is connected is strong enough or would there possibly be a stronger signal in another cell.

There is also another type of handovers called soft handover. In a soft handover, the user terminal is connected to more than one base station simultaneously. A softer handover is a soft handover between two sectors of a cell.

There are many reasons for a handover. The basic reason behind a handover is that the air interface connection no longer fulfils the criteria set for it. The most typical criteria for a handover are, for instance, signal quality, user mobility and traffic distribution.

A signal quality handover is made when the quality of the radio signal deteriorates below parameters defined in the radio network controller. The deterioration is detected by the signal measurements carried out by mobile stations or base stations.

A traffic distribution handover occurs when the traffic capacity of a cell has reached the maximum or is approaching it. In that situation, a mobile station near the edge of the cell with a high load may be transferred to a neighbouring cell with a smaller load.

The embodiment depicted by means of FIG. 2, is related to the inter radio network controller hard handover. Before a handover, the user terminal measures selected cells and/or frequencies in the cells to find an appropriate handover target cell. For measuring, the RNC reduces the used bit rate to give the user terminal time to carry out measurements. The reducing of the bit rate releases time slots. The reduced bit rate is called a compressed mode. The radio network controller (RNC) commands the user terminal to enter the compressed mode and provides downlink and uplink compressed mode parameters.

In the prior art, when a handover source RNC (the user terminal's current RNC) informs a handover target RNC that the connection switching should be carried out, the source RNC does not know the exact time when the user terminal is going to transmit or is able to receive signals via the new cell. The main source of delay is that hard handover messages are transmitted via the source RNC. Naturally, the delays vary according to radio conditions.

The basic idea of an embodiment of the inter-RNC hard handover method according to the invention is to estimate the delay of the channel change of a user terminal. In the embodiment, the switching time instant is controlled by delaying the sending of a "Relocation Detect" message from the target RNC. The delay is mainly due to the transmission and processing time of hard handover signalling messages from the handover source RNC over the air interface to the user terminal, the cell changeover time of the user terminal and the transmission time of user data in the uplink direction. Since the delay may vary according to the circumstances, the handover source RNC measures, in the embodiment, a user terminal round-trip time before a handover during compressed mode signalling. The handover source RNC sends the measured value to the handover target RNC within a new field of a signalling message. The time when the target RNC sends a "Relocation Detect" message to the CN is adjusted on the basis of the round-trip time and estimated (or previously known) user terminal cell changeover time.

An embodiment of the handover method begins in block 200. In block 202, a user terminal time delay between delivery and acknowledgement of a transmission is determined in a handover source network controller. The determination can be carried out in different ways, but typically the time delay is measured. This kind of time delay is usually called round-trip time. The round-trip time is typically measured during the compressed mode transmission explained above.

In block 204, the determined user terminal time delay is conveyed to a handover target network controller. The user terminal time delay can be delivered by adding a new field to a container that is passed to the handover target RNC during an inter-RNC hard handover.

In block 206, a switching time delay is calculated in the handover target network controller. The switching time is typically calculated by using the user terminal time delay and a user terminal changeover time. Therefore, the target RNC may calculate the switching time delay by using the following equation:

$$\frac{\text{round-trip time}}{2} + UE \text{ cell changeover time} \qquad (1)$$

wherein

UE means a user terminal (also user equipment), round-trip time is determined in block 202 and the UE cell changeover time is a previously known parameter or it can be estimated in several ways, for instance during an intra-RNC hard handover: a round-trip time is measured during configuration management and subtracted from the corresponding delay caused by a hard handover.

In block 208, user terminal data conveyance is transferred (or switched) to the handover target network controller at a moment based on the switching time delay. Typically, during the inter-RNC hard handover, the source RNC informs the target RNC of the drifting RNC change by sending a "relocation commit" message. After receiving the message, the target RNC (the new drifting RNC) may re-route data by sending a "relocation detect" message to the core network.

The embodiment ends in block 210. The method can be repeated when a next hard handover is carried out.

It is also possible that a handover does not succeed. Then, typically, the user terminal returns to the old channel or the call is terminated. If the user terminal returns to the old channel, it is possible to try again to carry out a handover.

In the following, an example of messaging during the compressed mode according to the embodiment described above is explained in further detail by means of FIG. 3. The source RNC typically makes the decision to start the compressed mode. It is possible that also other hard handover messages are conveyed in addition to those mentioned in the example.

According to FIG. 3, source RNC 110 sends a relocation required message to core network (CN) 112 after it has noticed that the user terminal has left the cells controlled by it. The message type is radio access network application (RANAP). The RANAP means a radio access network signalling protocol that consists of mechanisms that handle the procedures between the core network and the radio access network (RAN). The message is Relocation Required.

Then core network 112 sends an "RANAP: Relocation Request" message to relocation target RNC 300. The target RNC sends an "RANAP: Relocation request Ack" message (Ack=acknowledgement) meaning that it has received the "Relocation Request" message.

"RANAP: Relocation command" message is sent from core network 112 to source RNC 110. The source RNC sends an RRC: Physical Channel Reconfiguration message to the user terminal. The RRC means radio resource control. In the UMTS, RRC is a sub-layer of radio interface layer 3 and it provides information transfer services. RRC functions are typically responsible for controlling the configuration of radio interface layers 1 and 2.

The source RNC transmits an "RNSAP: Relocation commit" message to the target RNC. RNSAP means a radio network subsystem application part. RNSAP is a radio network subsystem signalling protocol for an Iur interface.

Next, the target RNC sends an "RANAP: Relocation Detect" message to the core network (CN). The "RANAP: Relocation Detect" message is typically sent after the expiration of a switch timer (usually timers give time limits for sending messages).

The user terminal informs the target RNC that it has completed the physical channel reconfiguration by sending a "Physical Channel Reconfiguration Complete" message.

The target RNC sends an "RANAP: Relocation Complete" message to the core network. The core network in turn sends an "Iu Release command" message to the source RNC. The Source RNC releases the Iu connection and sends an "RANAP: Iu Release Complete" message to the core network.

Referring to FIG. 4, a simplified block diagram illustrates an example of the radio network controller's (RNC) logical structure. A network controller is taken herein as an example of a controller. Both the source RNC and the target RNC may have the logical structure depicted in the example.

RNC is the switching and controlling element of UTRAN. The switching 400 takes care of connections between the core network and the user terminal. The radio network controller is located between Iub 402 and Iu 414 interfaces. The network controller is connected to these interfaces via interface units 404, 412. There is also an interface for inter-RNC transmission called Iur 416.

The functionality of the radio network controller can be classified into two classes: UTRAN radio resource management 406 and control functions 410. An operation and management interface function 408 serves as a medium for information transfer to and from network management functions.

The radio resource management is a group of algorithms used to share and manage the radio path connection so that the quality and capacity of the connection are adequate. The most important radio resource management algorithms are handover control, power control, admission control, packet scheduling, and code management.

The UTRAN control functions take care of functions related to the set-up, maintenance and release of a radio connection between the base stations and the user terminals. Therefore, the embodiments of the hard handover method described above are typically carried out in radio resource block 406 and UTRAN control block 410. The radio resource block 406 and control functions block 410 can be combined for forming a radio resource control (RRC) unit of a serving radio network controller (SRNC-RRC).

The precise implementation of the radio network controller (RNC) is vendor-dependent.

The disclosed functionalities of the embodiments of the invention can be advantageously implemented by means of software in appropriate parts of a radio network controller. Other implementation solutions are also possible such as different hardware implementations, e.g. a circuit built of separate logics components or one or more client-specific integrated circuits (Application-Specific Integrated Circuit, ASIC). A hybrid of these implementations is also feasible.

Even though the invention is described above with reference to an example according to the accompanying drawings, it is clear that the invention is not restricted thereto but it can be modified in several ways within the scope of the appended claims.

The invention claimed is:

1. A hard handover method in a communication system, the method comprising:
   determining user terminal time delay between delivery and acknowledgement of a transmission, in a handover source network controller;
   conveying the user terminal time delay to a handover target network controller;
   calculating a switching time delay in the handover target network controller using the user terminal time delay; and
   transferring user terminal data conveyance to the handover target network controller based on the switching time delay.

2. The method of claim 1, wherein a round-trip time is determined as the user terminal time delay between the delivery and the acknowledgement of the transmission.

3. The method of claim 1, wherein the switching time delay is controlled by delaying sending of a relocation detect message from a target radio network controller.

4. A hard handover method in a communication system, the method comprising:
   determining user terminal time delay between delivery and acknowledgement of a transmission, in a source controller;
   conveying the user terminal time delay to a target controller;
   calculating a switching time delay in the target controller; and
   transferring user terminal data conveyance to the target controller based on the switching time delay.

5. The method of claim 4, wherein the switching time delay is calculated using user terminal cell changeover time and the user terminal time delay between the delivery and the acknowledgement of the transmission.

6. A hard handover method in a communication system, the method comprising:

determining user terminal time delay between delivery and acknowledgement of a transmission, in a handover source network controller;
conveying the user terminal time delay to a handover target network controller;
calculating a switching time delay in the handover target network controller using the user terminal time delay; and
transferring user terminal data conveyance to the handover target network controller based on the switching time delay, wherein the user terminal time delay is conveyed by adding a new field to a container that is passed to the handover target network controller during an inter-radio network controller hard handover.

7. A hard handover method in a communication system, the method comprising:
determining user terminal time delay between delivery and acknowledgement of a transmission, in a handover source network controller;
conveying the user terminal time delay to a handover target network controller;
calculating a switching time delay in the handover target network controller using the user terminal time delay; and
transferring user terminal data conveyance to the handover target network controller based on the switching time delay, wherein the switching time delay is calculated by using an equation comprising $$\frac{\text{round-trip time}}{2} + UE \text{ cell changeover time,}$$

wherein
UE is a user terminal or a user equipment, and
the UE cell changeover time is a previously known parameter or is estimated during an intra-RNC hard handover, where a round-trip time is measured during a configuration management and subtracted from the switching time delay caused by the hard handover target network controller.

8. A controller of a communication system, the controller comprising:
means for determining user terminal time delay between delivery and acknowledgement of a transmission;
means for conveying the user terminal time delay;
means for calculating a switching time delay; and
means for transferring user terminal data conveyance to a handover target network controller based on the switching time delay.

9. A communication system, comprising:
a controller being configured to
determine user terminal time delay between delivery and acknowledgement of a transmission;
convey the user terminal time delay;
calculate a switching time delay;
transfer user terminal data conveyance to a handover target network controller based on the switching time delay; and
a conveying unit configured to convey the user terminal time delay by adding a new field to a container that is passed to the handover target network controller during an inter-radio network controller hard handover.

10. A communication system, comprising:
a controller being configured to
determine user terminal time delay between delivery and acknowledgement of a transmission;
convey the user terminal time delay;
calculate a switching time delay;
transfer user terminal data conveyance to a handover target network controller based on the switching time delay; and
a calculating unit configured to calculate the switching time by using an equation comprising $$\frac{\text{round-trip time}}{2} + UE \text{ cell changeover time,}$$

wherein
UE is a user terminal or a user equipment, and
UE cell changeover time is a previously known parameter or is estimated during an intra-radio network controller hard handover, where a round-trip time is measured during a configuration management and subtracted from the switching time delay caused by the hard handover target network controller.

11. A communication system, comprising:
a controller being configured to
determine user terminal time delay between delivery and acknowledgement of a transmission;
convey the user terminal time delay;
calculate a switching time delay; and
transfer user terminal data conveyance to a handover target network controller based on the switching time delay.

12. The controller of a communication system of claim 11, further comprising:
a calculating unit configured to calculate the switching time delay using user terminal cell changeover time and the user terminal time delay between the delivery and the acknowledgement of the transmission.

13. The controller of a communication system of claim 11, further comprising:
a determining unit configured to determine a round-trip time as the user terminal time delay between the delivery and the acknowledgement of the transmission.

14. The controller of a communication system of claim 11, further comprising:
a controller configured to control the switching time delay by delaying sending of a relocation detect message from a target radio network controller.

15. A communication system, the system comprising:
means for determining user terminal time delay between delivery and acknowledgement of a transmission;
means for conveying the user terminal time delay;
means for calculating a switching time delay; and
means for transferring user terminal data conveyance to a handover target network controller based on the switching time delay.

16. A communication system, the system being configured to:
determine user terminal time delay between delivery and acknowledgement of a transmission;
convey the user terminal time delay;
calculate a switching time delay;
transfer user terminal data conveyance to a handover target network controller based on the switching time delay; and
a conveying unit configured to convey the user terminal time delay by adding a new field to a container that is passed to the handover target network controller during an inter-radio network controller hard handover.

17. A communication system, the system being configured to:
    determine user terminal time delay between delivery and acknowledgement of a transmission;
    convey the user terminal time delay;
    calculate a switching time delay;
    transfer user terminal data conveyance to a handover target network controller based on the switching time delay; and
    a calculating unit configured to calculate the switching time by using an equation comprising $$\frac{\text{round-trip time}}{2} + UE \text{ cell changeover time},$$

wherein
UE is a user terminal or a user equipment, and
UE cell changeover time is a previously known parameter or is estimated during an intra-radio network controller hard handover, where a round-trip time is measured during a configuration management and subtracted from the switching time delay caused by the hard handover target network controller.

18. A communication system, the system being configured to:
    determine user terminal time delay between delivery and acknowledgement of a transmission;
    convey the user terminal time delay;
    calculate a switching time delay; and
    transfer user terminal data conveyance to a handover target network controller based on the switching time delay.

19. The communication system of claim 18, farther comprising:
    a calculating unit configured to calculate the switching time delay using user terminal cell changeover time and the user terminal time delay between the delivery and the acknowledgement of the transmission.

20. The communication system of claim 18, further comprising:
    a determining unit configured to determine a round-trip time as the user terminal time delay between the delivery and the acknowledgement of the transmission.

21. The communication system of claim 18, further comprising:
    a controller configured to control the switching time delay by delaying sending of a relocation detect message from a target radio network controller.

* * * * *